(12) United States Patent
Fukami et al.

(10) Patent No.: US 8,387,414 B2
(45) Date of Patent: Mar. 5, 2013

(54) METHOD AND APPARATUS FOR BENDING A GLASS SHEET

(75) Inventors: Masao Fukami, Aichi (JP); Shinya Oota, Tokyo (JP); Tatsuo Yajima, Kanagawa (JP); Tomio Kajikawa, Aichi (JP); Mikinao Sasaki, Aichi (JP)

(73) Assignee: Asahi Glass Company, Limited, Tokyo (JP)

( * ) Notice: Subject to any disclaimer, the term of this patent is extended or adjusted under 35 U.S.C. 154(b) by 1086 days.

(21) Appl. No.: 11/847,650

(22) Filed: Aug. 30, 2007

(65) Prior Publication Data

US 2008/0000267 A1 Jan. 3, 2008

Related U.S. Application Data

(60) Division of application No. 10/724,824, filed on Dec. 2, 2003, now Pat. No. 7,401,476, which is a continuation of application No. PCT/JP03/03015, filed on Mar. 13, 2003.

(30) Foreign Application Priority Data

Mar. 13, 2002 (JP) .................................. 2002-068608

(51) Int. Cl.
C03B 23/025 (2006.01)
C03B 23/027 (2006.01)
C03B 23/03 (2006.01)
(52) U.S. Cl. .......................................... 65/107; 65/291
(58) Field of Classification Search .................... 65/273, 65/102, 106, 107, 289, 291, 290, 275, 356, 65/182.2, 25.4
See application file for complete search history.

(56) References Cited

U.S. PATENT DOCUMENTS

| 3,332,762 | A | * | 7/1967 | McMaster et al. | 65/25.2 |
|---|---|---|---|---|---|
| 3,573,889 | A | * | 4/1971 | McMaster | 65/62 |
| 4,229,200 | A | | 10/1980 | Seymour | |
| 4,437,872 | A | | 3/1984 | McMaster et al. | |
| 4,778,507 | A | | 10/1988 | Aruga et al. | |
| 4,915,722 | A | | 4/1990 | Havenith et al. | |
| 4,990,170 | A | | 2/1991 | Vanaschen et al. | |
| 5,004,491 | A | | 4/1991 | McMaster et al. | |
| 5,302,176 | A | | 4/1994 | Shibuya et al. | |
| 5,372,624 | A | * | 12/1994 | Lesage et al. | 65/106 |
| 5,634,957 | A | * | 6/1997 | Sykes et al. | 65/106 |
| 5,713,976 | A | | 2/1998 | Kuster et al. | |
| 6,158,247 | A | * | 12/2000 | Didelot | 65/106 |
| 7,401,476 | B2 | * | 7/2008 | Fukami et al. | 65/106 |

(Continued)

FOREIGN PATENT DOCUMENTS

CN 1111906 A 11/1995
EP 0 335 749 A1 10/1989

(Continued)

OTHER PUBLICATIONS

U.S. Appl. No. 12/792,868, filed Jun. 3, 2010, Fukami, et al.

(Continued)

Primary Examiner — Jason L Lazorcik
Assistant Examiner — Cynthia Szewczyk
(74) Attorney, Agent, or Firm — Oblon, Spivak, McClelland, Maier & Neustadt, L.L.P.

(57) ABSTRACT

A method for bending a glass sheet is provided wherein the glass sheet is put on a bending surface of a frame unit to be preliminarily bent by gravity before the glass sheet is pressed by an upper mold and frame unit. The method is utilized for controlling the amount of preliminary bending so as to control deformation of the glass sheet caused by the preliminary bending and pressing occurs on the preliminary bent glass sheet by the upper mold and the frame unit.

7 Claims, 10 Drawing Sheets

U.S. PATENT DOCUMENTS

2005/0138967 A1 6/2005 Hori et al.
2007/0144211 A1 6/2007 Hori et al.

FOREIGN PATENT DOCUMENTS

| JP | 2-38332 | 2/1990 |
|----|---------|--------|
| JP | 2-51435 | 2/1990 |
| JP | 7-187691 | 7/1995 |
| JP | 64-52628 | 2/1998 |
| WO | WO 96/40594 | 12/1996 |

OTHER PUBLICATIONS

U.S. Appl. No. 12/488,298, filed Jul. 19, 2009, Fukami, et al.

* cited by examiner

METHOD AND APPARATUS FOR BENDING A GLASS SHEET

CROSS-REFERENCE TO RELATED APPLICATIONS

This application is a divisional of and claims the benefit of priority under 35 U.S.C. §120 from U.S. Ser. No. 10/724,824, filed Dec. 2, 2003, which is a continuation of PCT/JP03/03015, filed Mar. 13, 2003 and claims the benefit of priority under 35 U.S.C. §119 from Japanese Application No. 2002-068608, filed Mar. 13, 2002, the entire contents of each are incorporated herein by reference.

TECHNICAL FIELD

The present invention relates to a method and an apparatus for bending a glass sheet, in particular a method and an apparatus for bending a glass sheet, which is suited to bend a glass sheet in a desired curved shape, the glass sheet having been heated to a temperature close to a softening point.

BACKGROUND ART

Heretofore, curved glass sheets having various shapes or curvatures have been used as automobile windows. Various kinds of methods have been proposed as the method for producing that sort of curved glass sheets. Among these methods, a method for press-bending in a heating furnace is suited to realize a complicated shape, such as a shape having a vertical section substantially like the letter S, or a deeply bent shape, since this method can bend a glass sheet in a high temperature state. For example, JP-A-1-52628 discloses a technique that a hollow member having a box-like shape is used as a lower mold to put a glass sheet thereon and that air is supplied into the hollow member to raise the pressure in the hollow member to push the entire area of a rear side of the glass sheet against an upper mold by the air pressure. This technique is said to be able to easily realize a complicated shape since it is possible to uniformly pressurize the rear side of the glass sheet in a wide range.

However, since the above-mentioned conventional technique utilizes both press-bending and air-pressuring to instantly bend a substantially flat glass sheet in a desired complicated shape or a desired deeply bent shape, this conventional technique has a problem in that the glass sheet has an optical distortion created in several portions or has a crease formed in a surface. That sort of problem is caused because a substantially flat glass sheet is greatly bent in a short time period by press-bending and air-pressuring. Although that sort of problem may be avoided by providing a sufficient time period for bending, a new problem that the productivity of curved glass sheets lowers is caused in this case.

It is normal that the lower mold and the upper mold utilized for press-bending have bending surfaces covered with woven cloth, such as heat-resistant cloth, in order to prevent a glass sheet from being damaged. In order to provide a glass sheet with a complicated shape or the like, both molds are formed in greatly curved shapes to conform to the shape of a curved glass sheet to be produced. The molds are quite different from the glass sheet in terms of shape before bending. For this reason, the glass sheet is apt to have local portions brought into strong contact with a mold. As a result, there has been caused a problem that the heat-resistant cloth on these local portions is apt to be broken while repeatedly making press-bending of glass sheets.

In some cases, when a glass sheet, which is quite different from the molds in terms of shape, is forcibly pressed, the glass sheet has the impression of a ring for supporting the glass sheet marked on a peripheral portion of the glass sheet.

The present invention is proposed to avoid the problems of the conventional technique. It is an object of the present invention to provide a method and an apparatus for bending a glass sheet, which are capable of producing, with high productivity, a glass sheet having such a complicated shape or a deeply bent shape that is difficult to be realized by the conventional technique, or which are capable of rapidly making preliminary bending.

DISCLOSURE OF THE INVENTION

The present invention provides a method for bending a glass sheet, wherein a preliminarily heated and softened glass sheet is pressed in a desired shape by an upper mold and a frame unit, the upper mold having a bending surface facing downward in a substantially vertical direction, and the frame unit having a bending surface facing upward in the substantially vertical direction so as to be engageable with the bending surface of the upper mold, comprising the steps of putting the heated and softened glass sheet on the bending surface of the frame unit to preliminarily bend the glass sheet by gravity before pressing the glass sheet by the upper mold and the frame unit, and using means for controlling the amount of preliminary bending to control deformation of the glass sheet caused by the preliminary bending; and pressing the preliminarily bent glass sheet by the upper mold and the frame unit.

In a mode of the present invention, it is preferable that the method comprises the steps of dropping the heated and softened glass sheet onto the frame unit to put the glass sheet thereon; conveying the glass sheet to a position just under the upper mold in such a state that the glass sheet is put on the frame unit; and preliminarily bending the glass sheet in a shape approximating the bending surface of the upper mold by using the means for controlling an amount of preliminary bending to control the deformation of the glass sheet by gravity between just before putting the glass sheet on the frame unit and just before pressing the glass sheet.

In a mode of the present invention, it is preferable that the means for controlling the amount of preliminary bending comprises a lower mold having the bending surface facing upward in the substantially vertical direction and provided on an inner peripheral side of the frame unit; the bending surface of the lower mold have a plurality of holes formed therein to communicate with an air suction means; whereby air is sucked through the holes by the air suction means to accelerate the preliminary bending of the glass sheet.

In a mode of the present invention, it is preferable that the method further comprises the steps of supporting the glass sheet in an air-floating fashion by an air-floating means and positioning the glass sheet; and sticking and holding the positioned glass sheet by a sticking means and conveying the glass sheet to a position above the frame unit by the sticking means, the sticking means being brought near to the glass sheet from upward.

In a mode of the present invention, it is preferable that the method further comprises a step for providing plural kinds of means for controlling an amount of preliminary bending, and selecting a desired means for controlling an amount of preliminary bending according to a type of the glass sheet to be bent.

On the other hand, the present invention provides an apparatus for bending a glass sheet, comprising an upper mold having a bending surface facing downward in a substantially vertical direction, and a frame unit having a bending surface facing upward in the substantially vertical direction so as to be engageable with the bending surface of the upper mold, whereby a preliminarily heated and softened glass sheet is pressed by the upper mold and the frame unit to be bent in a desired shape, further comprising means for controlling an amount of preliminary bending to control deformation of the heated and softened glass sheet caused by the preliminary bending, the glass sheet being put on the frame unit In a mode of the present invention, it is preferable that the apparatus further comprises means for holding the heated and softened glass sheet onto the frame unit and for dropping the glass sheet on the frame unit to put the glass sheet thereon; and means for conveying the frame unit with the glass sheet put thereon to a position just under the upper mold; whereby the glass sheet is preliminarily bent in a shape approximating the bending surface of the upper mold by using the means for controlling an amount of preliminary bending to control the deformation of the glass sheet by gravity between just before putting the glass sheet on the frame unit and just before pressing the glass sheet.

In a mode of the present invention, it is preferable that the apparatus further comprises air-floating means for supporting the glass sheet in an air-floating fashion; positioning means for positioning the glass sheet supported in the air-floating fashion; and sticking means to be brought near to the glass sheet from upward for sticking and holding the glass sheet and conveying the glass sheet to a position above the frame unit.

In a mode of the present invention, it is preferable that the apparatus further comprises plural means for controlling the amount of preliminary bending, and a controller for selecting a desired means for controlling an amount of preliminary bending according to a type of the glass sheet to be bent.

In a mode of the present invention, it is preferable that the means for controlling the amount of preliminary bending comprises a lower mold having the bending surface facing upward in the substantially vertical direction and provided on an inner peripheral side of the frame unit; the bending surface of the lower mold have a plurality of holes formed therein to communicate with an air suction means; whereby air is sucked through the holes by the air suction means to accelerate the preliminary bending of the glass sheet.

In a mode of the present invention, it is preferable that the means for controlling the amount of preliminary bending comprises a heater for heating a desired portion of the glass sheet put on the frame unit, whereby the desired portion of the glass sheet conveyed along with the frame unit is heated by the heater to accelerate the preliminary bending of the glass sheet.

In a mode of the present invention, it is preferable that the means for controlling the amount of preliminary bending comprises sticking means with a heater incorporated thereinto whereby while the heated and softened glass sheet is stuck and held by the sticking means, a desired portion of the glass sheet is heated to accelerate the preliminary bending of the glass sheet.

In a mode of the present invention, it is preferable that the means for controlling an amount of preliminary bending comprises an air-floating means with a heater incorporated thereinto, whereby a desired portion of the heated and softened glass sheet is heated to accelerate the preliminary bending of the glass sheet while the glass sheet is supported in the air-floating fashion by the air-floating means.

In a mode of the present invention, it is preferable that the means for controlling an amount of preliminary bending comprises a frame unit including a fixed frame and a movable frame pivoted on the fixed frame, whereby the movable frame is tilted about a portion of the fixed frame unit with the movable frame pivoted thereon to raise an end of the heated and softened glass sheet, accelerating the preliminary bending of the glass sheet.

In a mode of the present invention, it is preferable that the means for controlling an amount of preliminary bending comprises an outer frame unit including a fixed frame and a movable frame pivoted on the fixed frame, and an inner frame/flat member provided on an inner peripheral side of the outer frame unit and having a flatter shape than the outer frame unit; whereby the glass sheet is transferred onto the outer frame unit after having been put on the inner frame/flat member, and the movable frame is tilted about a portion of the fixed frame with the movable frame pivoted thereon to raise an end of the heated and softened glass sheet, thus accelerating the preliminary bending of the glass sheet.

In a mode of the present invention, it is preferable that the upper mold, the frame units and the means for controlling an amount of preliminary bending are provided in a heating furnace.

In a mode of the present invention, it is preferable that the bending surface of the upper mold has a plurality of holes formed therein, and the holes are connected to an air supply/exhaustion means.

BEST MODE FOR CARRYING OUT THE INVENTION

Figure 1:
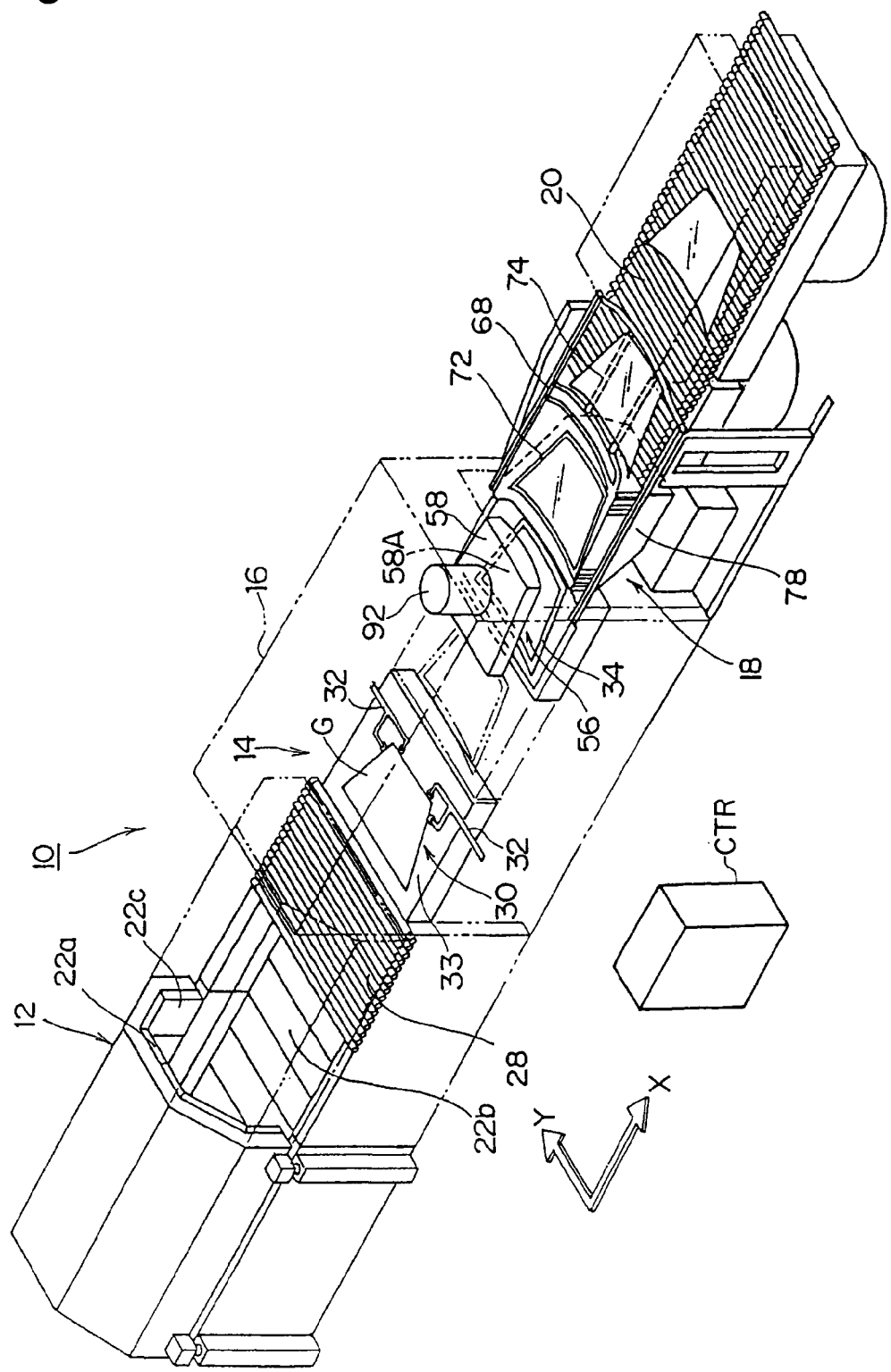
FIG. 1 is a perspective view showing the apparatus for bending a glass sheet according to an embodiment of the present invention, wherein some members are shown in a transparent fashion.

In the figures are shown a bending apparatus 10, a heating furnace 12, a positioning zone 14, a bending furnace 16, an air-cooling and tempering zone 18, a discharge roller conveyer 20, a frame 34, a lower mold 56, a hole 56A, an upper mold 58, a hole 58A, an air-cooling and tempering unit 70, a quench ring 72, a catch member 74, an upper blowing head 76, a lower blowing head 78, an air-floating unit 80, a heater 170, 180 and 190, a frame unit 200, and a glass sheet G.

Now, preferred embodiments of the method and the apparatus for bending a glass sheet according to the present invention will be described, referring to the accompanying drawings.

Figure 2:
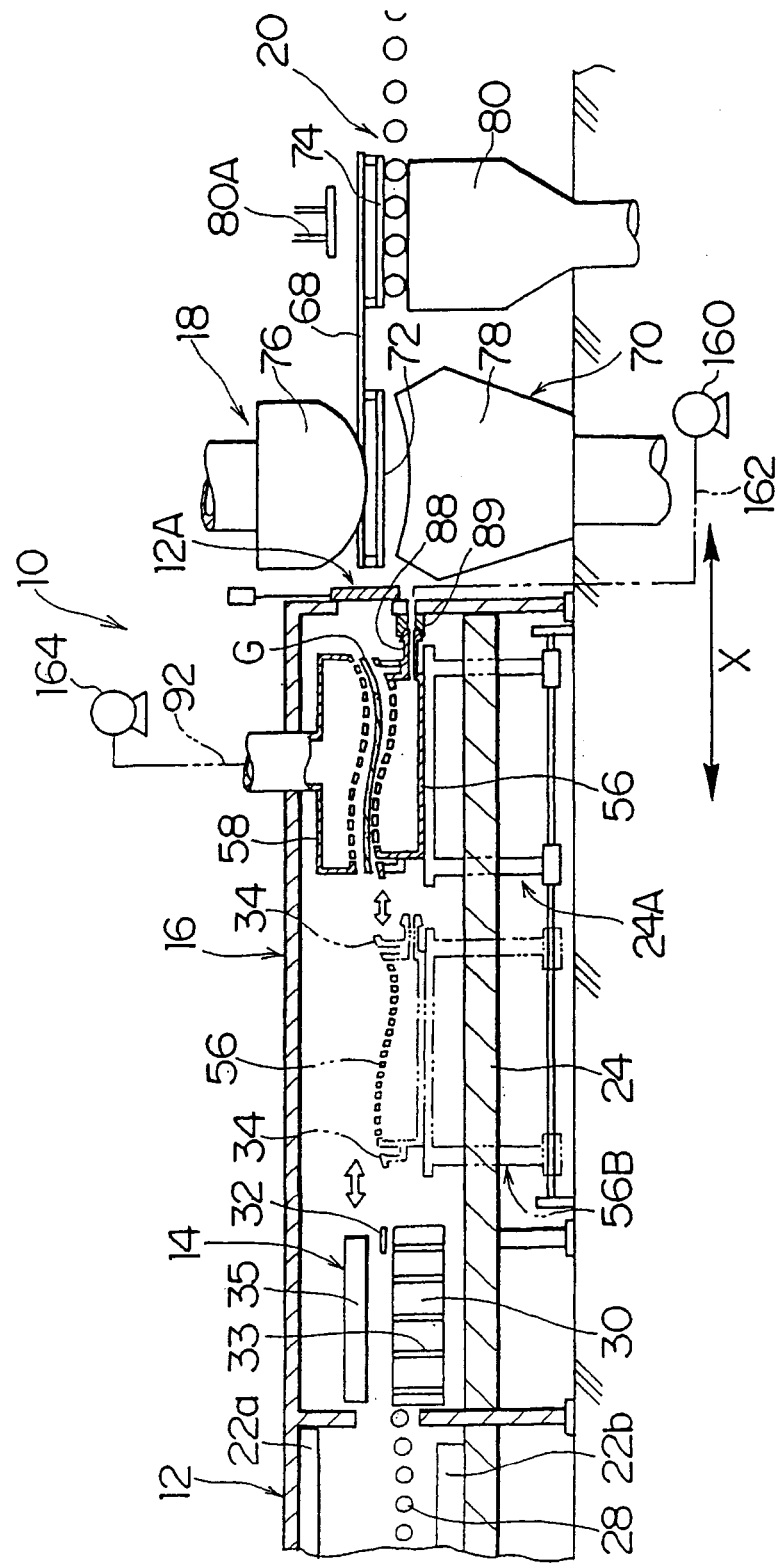
FIG. 2 is a schematic side view showing the structure of apparatus shown in FIG. 1.

The apparatus for bending a glass sheet 10 shown in FIGS. 1 and 2 comprises a heating furnace 12, a positioning zone 14, a bending furnace 16, an air cooling and tempering zone 18, a discharge roller conveyor 20, a controller CTR for controlling the actions of the respective members, and the like. The heating furnace 12 is an electric heating furnace, which is divided into a plurality zones (including the positioning zone 14 and the bending furnace 16). Each of the zones includes a ceiling heater 22a, a floor heater 22b and a lateral heater 22c. With respect to some of the zones, no heater is shown for simplifying explanation.

The amount of heat produced by the respective heaters is set, depending to the size, the thickness and the like of a glass sheet to be bent G, in every zone. The glass sheet G is conveyed by a roller conveyor 28 in the heating furnace 12, is heated to a certain bending temperature (650 to 720° C.) during conveyance and is conveyed into the positioning zone 14.

The positioning zone 14 includes a hearth bed 30 (corresponding to the air-floating means recited in Claims), traveling positioners 32 (corresponding to the positioning means recited in Claims) and a flat mold 35 (corresponding to the sticking means recited in Claims). The hearth bed 30 is a mold platen, which has a surface confronting the glass sheet G formed in a greater size than the glass sheet G. This surface is flat and is formed with many air injection holes 33 (FIG. 2) in a dense fashion.

The hearth bed 30 has a lower portion formed with an air inlet (not shown) in communication with the air injection holes 33, and the air inlet is connected to a blower for combustion (not shown) through a damper (not shown). The compressed air supplied from the blower for combustion passes through the air inlet and is injected upward from the hearth bed 30 through the air injection holes 33 after having been pressure-regulated by the damper. The pressure of the injected air is set so that the glass sheet G can be supported in an air-floating fashion. Thus, the glass sheet G, which has been conveyed into the positioning zone 14, is separated from the hearth bed 30 by the air pressure and is floating above the hearth bed 30, being supported in an air-floating fashion.

The conveying path that is formed by a rear portion of the roller conveyor 28 and the hearth bed 30 slopes slightly downward (e.g., at an angle of 1 deg) toward downstream in the conveying direction (in the right direction in FIG. 2). By combination of the inertia force given by the roller conveyor 28 and the weight of the glass sheet G, the glass sheet G is moved in the right direction, being supported above the hearth bed 30 in an air-floating fashion.

Figure 3:
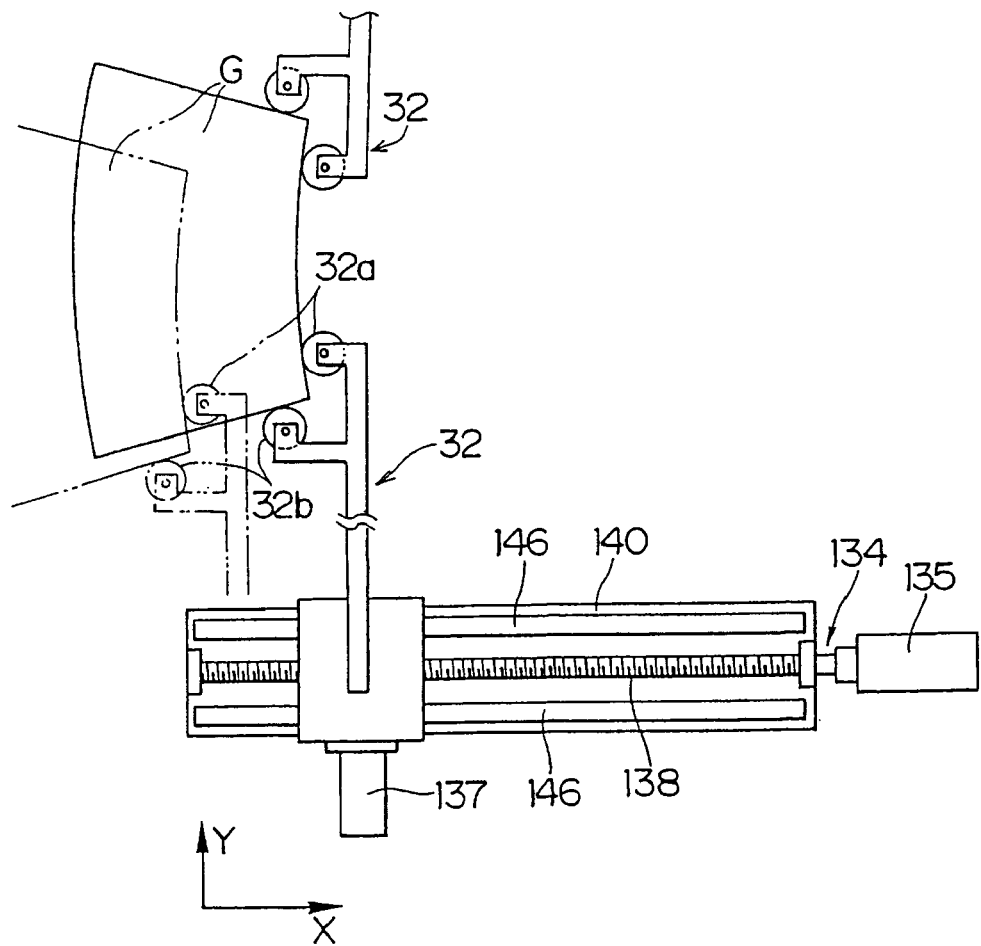
FIG. 3 is a plan view showing the structure of positioners.

As shown in FIG. 3, the positioners 32 and 32 are provided at totally two locations to receive both corners of a downstream side of the glass sheet G supported in an air-floating fashion. These positioners 32 and 32 are provided so as to be movable in the conveying direction of the glass sheet G (hereinbelow, referred to as the X direction) and in a horizontal direction perpendicular to the X direction (hereinbelow, referred to as the Y direction). Each of the paired positioners 32 and 32 has a leading edge with two prongs, and disks 32a and 32b for contact with edges of the glass sheet G are mounted on the lower sides of the two prongs so as to be rotatable. When the glass sheet G has been conveyed into the positioning zone 14, the leading edge of the glass sheet G is brought into contact with the disks 32 and 32b to regulate the movement of the glass sheet G in the conveying direction, positioning the glass sheet G in the X direction.

Additionally, at the same time as the positioners 32 and 32 move in the X direction with the glass sheet G received by the disks 32a and 32a, the positioners 32 and 32 move inwardly in the Y direction to move the glass sheet G by a slight distance in the Y direction, with the disks 32b and 32b of the prongs contacting the corners of the glass sheet G, for positioning in the Y direction. The positioning of the glass sheet G is performed in this manner. In other words, the glass sheet G is positioned in the X and Y directions in the positioning zone 14.

The positioning is performed to accurately position the glass sheet G with respect to bending molds (a frame 34, a lower mold 56 and an upper mold 58), which are provided in the bending furnace 16 at a rear stage. The glass sheet G, which has been positioned as stated earlier, is stuck by the flat mold 35 and is conveyed into the bending furnace 16.

Figure 4:
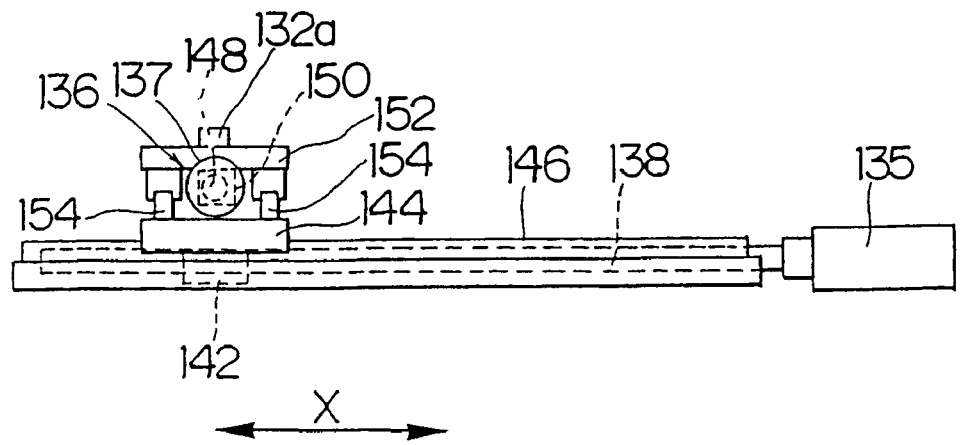
FIG. 4 is a side view showing the structure of a positioner.

Now, the mechanism of the positioners 32 will be explained. As shown in FIGS. 3 and 4, each of the positioners 32 and 32 comprises a ball screw drive 134 provided in the X direction, a ball screw drive 136 provided in the Y direction, and the like. The ball screw drive 134 has a lead screw 138 provided along a base 140 provided in the X direction, and the ball screw drive 134 has a nut 142 provided on a lower side of an X-block 144. The X-block 144 is engaged with the lead screw 138 through the nut 142 and is supported so as to be movable in the X direction on a pair of rails 146 and 146 provided along the base 140. By this arrangement, when the motor 135 of the ball screw drive 134 is rotated in a forward or reverse direction, the X-block 144 moves in the X direction.

The lead screw 148 that is shown in a dotted line in FIG. 4 is provided on an upper side of the X-block 144 along the Y direction. The ball screw drive 136 has a nut 150 provided on a Y-block 152. The Y-block 152 is engaged with the lead screw 148 through the nut 150 and is supported so as to be movable in the Y direction on a pair of rails 154 and 154 provided along the upper side of the X-block 144.

By this arrangement, when the motor 137 of the ball screw drive 136 is rotated in a forward or reverse direction, the Y-block 152 moves in the Y direction. Thus, the positioner 32 fixed on each of the Y-blocks 152 is moved in the X direction and in the Y direction by operating the ball screw drives 134 and 136. The positioning zone 14 also has a ceiling heater provided on a furnace wall above the hearth bed 30 in order to maintain the glass sheet G at a high temperature during positioning.

On the other hand, the flat mold 35 shown in FIG. 2 is a mold platen, which has a surface confronting the glass sheet G formed in a greater size than the glass sheet G. This flat mold has a lower flat surface formed with many air injection holes and suction holes in a dense fashion. The flat mold 35 has an upper portion formed with an air inlet (not shown) in communication with the air injection holes and the suction holes, and the air inlet is connected to the blower for combustion (not shown) and an air-sucking unit through a damper (not shown). The flat mold 35 can be configured to move between a position above the hearth bed 30 and a position above the lower mold 56 (stated later) in the bending furnace 16 by a conveying unit.

The bending furnace 16 is in communication with the positioning zone 14, and the atmosphere in the bending furnace is kept in a high temperature state by an unshown heater as in the positioning zone 14. The glass sheet G is positioned in the positioning zone 14. When the glass sheet G is stuck and held by the flat mold 35 lowering, the pressure of the air injected from the air injection holes 33 of the hearth bed 30 is increased in comparison with the air pressure for supporting the glass sheet G in an air-floating fashion to assist the flat mold in sticking and holding the glass sheet G.

The glass sheet G stuck and held by the flat mold 35 is conveyed, along with the flat mold, at the position above the lower mold 56 in the bending furnace 16, being stuck and held. The glass sheet G, which has conveyed to above the lower mold 56, is released from the sticking and holding by the flat mold 35 and is fallen onto the frame 34 (stated later). The flat mold and the lower mold may be configured so that the flat mold 35 makes only a vertical movement and that the lower mold 56 moves to under the flat mold and then the glass sheet G is released from the sticking and holding by the flat mold to be put on the frame 34.

The lower mold 56, the upper mold 58 and the like are provided in the bending furnace 16. The lower mold 56 is configured so as to be movable, in the X direction (in the right and left directions in this figure), on rails 24A provided in the bending furnace 16. The glass sheet G, which has been conveyed from the positioning zone 14, is put on the frame 34 and the lower mold 56 at a position indicated by imaginary lines in FIG. 2. Then, the lower mold 56 moves in the right direction and arrives at a position indicated by solid lines in FIG. 2, i.e., a position confronting the upper mold 58. The movement of the lower mold 56 or the like is performed by an unshown conveying unit (e.g., a timing belt). On the other hand, the upper mold is supported so as to be liftable by an unshown conveying unit (e.g., a timing belt).

Figure 5:
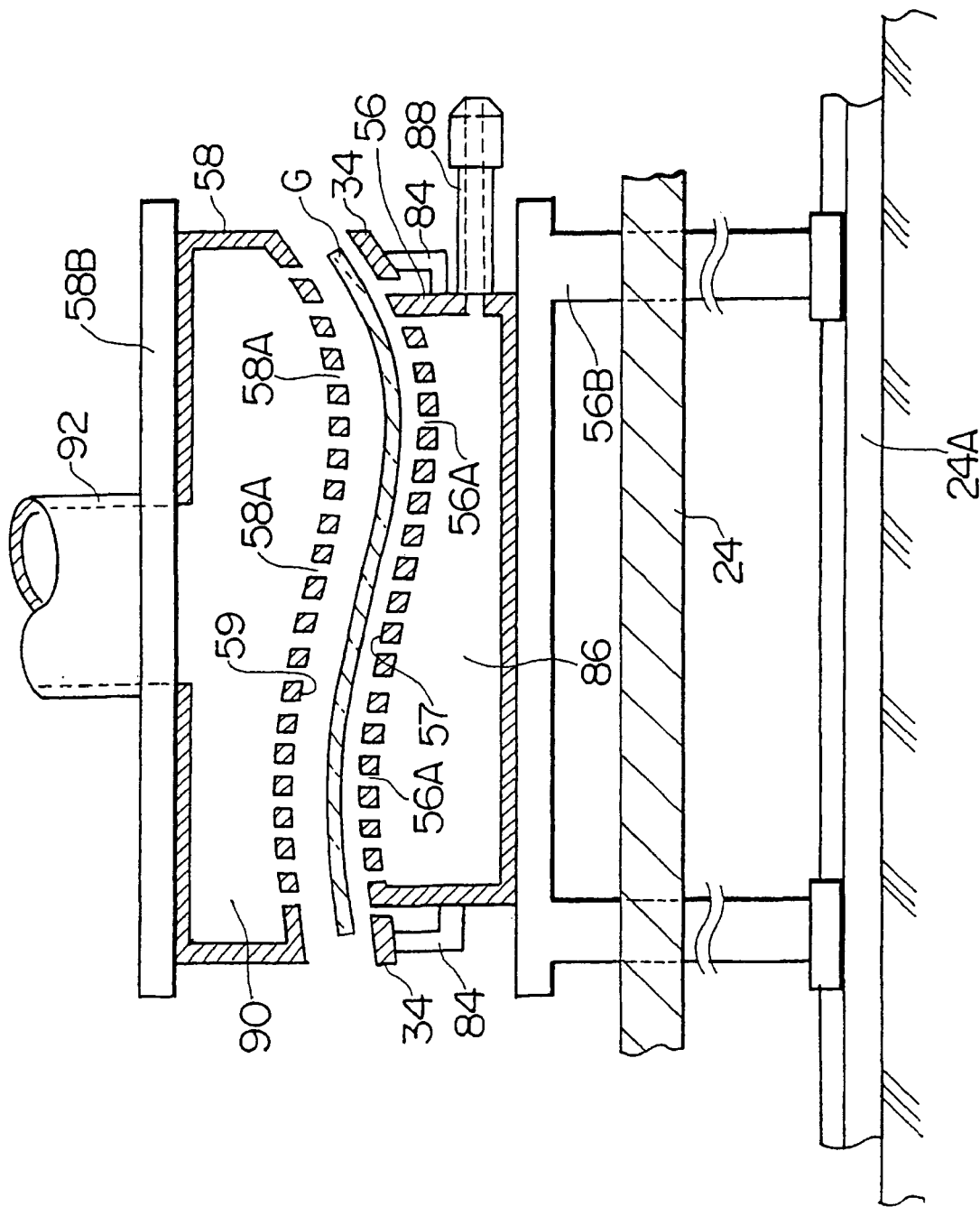
FIG. 5 is a cross-sectional view of the essential members of the means for controlling an amount of preliminary bending according to the embodiment.

FIG. 5 is a cross-sectional view showing the positional relationships among of the essential members, such as the glass sheet G, the frame 34, the lower mold 56 and the upper mold 58. The lower mold 56 is provided on an inner peripheral side of the frame 34. The lower mold 56 has holes 56A formed in a bending surface 57 substantially in the entirety at certain intervals. The respective holes communicate with an air path 86. The air path 86 has a male head for piping 88, which engages with a female head for piping 89 (see FIG. 2) when the lower mold 56 has arrived at a distal end. The female head for piping 89 is connected to an air supply/exhaustion unit (corresponding to the air suction means recited in the Claims) 160 shown in FIG. 2 through a pipe 162 indicated by a chain double-dashed line.

By this arrangement, the air supply/exhaustion unit 160 can be actuated to inject air from the holes 56A shown in FIG. 5 or suck air from the holes 56A. By sucking air from the holes 56A, the glass sheet G can be stuck and held by the bending surface 57 of the lower mold 56, which is curved so as to have an S-character shape in section.

The frame 34 is provided so as to surround the lower mold 56. The frame 34 is formed so as to have a peripheral shape, which is substantially similar to a desired bent shape of a curved glass sheet to be bent. The frame 34 is supported by a lateral wall of the lower mold 56 through a plurality of supporting arms 84.

The lower mold 56 is fixed on a shuttle 56B, and the shuttle 56B is slidably supported on the rails 24A provided under a hearth 24. The hearth 24 has slits formed, allowing legs of the shuttle 56B to move horizontally. The lower mold 56 and the like are movable in the right and left directions in this figure by the unshown conveying unit (timing belt). When the lower mold 56 is located at the position indicated by imaginary lines in FIG. 2, the glass sheet G is put on the frame 34. When the lower mold 56 is located at a position indicated by solid lines in FIG. 2, the lower mold confronts the upper mold 58 to bend the glass sheet G in cooperation with the upper mold 58.

The upper mold 58 has a bending surface corresponding to the substantially entire surface of the glass sheet G. The bending surface 59 of the upper mold 58 has holes 58A formed therein substantially in the entirety at certain intervals. The respective holes 58A communicate with an air path 90. The air path 90 is connected to an air supply/exhaustion unit 164 (FIG. 2) through a duct 92. By this arrangement, the air supply/exhaustion unit 164 can be actuated to inject or suck air from the holes 58A shown in FIG. 5. By sucking air from the holes 58A, the glass sheet G can be stuck and held by the bending surface 59 of the upper mold 58, which is curved so as to have an S-character shape in section. The bending surface 57 of the lower mold 56 is formed in a substantially reversed shape of the bending surface 59 of the upper mold 58.

The upper mold 58 is fixed to a lower portion of a carriage 58B, and the carriage 58B is supported so as to be vertically movable by a ceiling portion of the bending furnace 16 through an unshown lifting unit. When bending is performed outside the furnace, it is preferable that the bending surface 59 of the upper mold 58 is formed in substantially the same shape as the glass sheet G as a final product. When bending is performed in the bending furnace 16 as in this embodiment, it is preferable that the bending surface of the upper mold is formed in a shape slightly different from the glass sheet G as the final product, considering that after bending, the glass sheet G is deformed by gravity during conveyance to the tempering zone 18.

The air-cooling and tempering zone 18 shown in FIG. 2 comprises a quench shuttle 68, an air-cooling and tempering unit 70 and the like. The quench shuttle 68 has a quench ring 72 fixed to a left portion thereof in FIG. 2 and a catch member 74 fixed to a right portion thereof. The quench ring 72 is an instrument for receiving the glass sheet G bent in the bending furnace 16 and is formed in a shape substantially conforming to the bent shape of a curved glass sheet to be bent. The quench ring 72 is reciprocated between a position under the upper mold 58 in the bending furnace 16 ("receiving position" for a glass sheet) and an air-cooling and tempering position for the air-cooling and tempering by the air-cooling and tempering unit 70 ("transferring position" for a glass sheet) by reciprocating the quench shuttle 68 in the X direction.

The air-cooling and tempering unit 70 comprises an upper blowing head 76 and a lower blowing head 78, by which cooling air supplied from a blower (not shown) is injected onto both upper and lower sides of the glass sheet G. The glass sheet G is air-cooled and quenched by the cooling air injected from the upper blowing head 76 and the lower blowing head 78 after the glass sheet G has been positioned at the "air-cooling and tempering position" between the upper blowing head 76 and the lower blowing head 78, being supported by the quench ring 72. The cooling air supplied from the lower blowing head 78 is set so as to have such a pressure to be capable of supporting the glass sheet G in an air-floating fashion. By this arrangement, the glass sheet G which has been positioned at the "air-cooling and tempering position", is air-cooled and tempered, being supported in an air-floating fashion. In the meantime, the quench shuttle 68 moves toward the left direction in FIG. 2 to the above-mentioned "receiving position".

On the other hand, the catch member 74 receives the glass sheet Q which has been air-cooled and tempered at the "air-cooling and tempering position", being supported in an air-floating fashion. The catch member includes a plurality of frames for putting the glass sheet G thereon. The catch member 74 is reciprocated between the "air-cooling and tempering position" and an inlet of the discharge roller conveyor 20 by reciprocating the quench shuttle 68 in the X direction.

The quench shuttle 68 is reciprocated in the X direction by a drive for horizontal movement (not shown), such as a chain drive or a timing belt drive. At the inlet of the discharge roller conveyor 20 is provided an air-floating unit 80. The glass sheet G, which has been conveyed by the quench shuttle 68 after being air-cooled and tempered, is floated and pushed against a stopper 80A by air injected upward from the air-floating unit 80. In the meantime, the quench shuttle 68 moves toward the left direction in FIG. 2 to the above-mentioned "receiving position". The air-floating unit 80 gradually decreases the air pressure so that the glass sheet G. which is supported in an air-floating fashion, is put on the discharge roller conveyor 20 gently. The glass sheet G, which has been put on the roller conveyor 20, is conveyed to an unshown inspection zone at a later stage.

Now, the operation of the bending apparatus 10 will be described. The actions of the respective members are controlled by the controller CTR, which comprises a computer.

Figure 6:
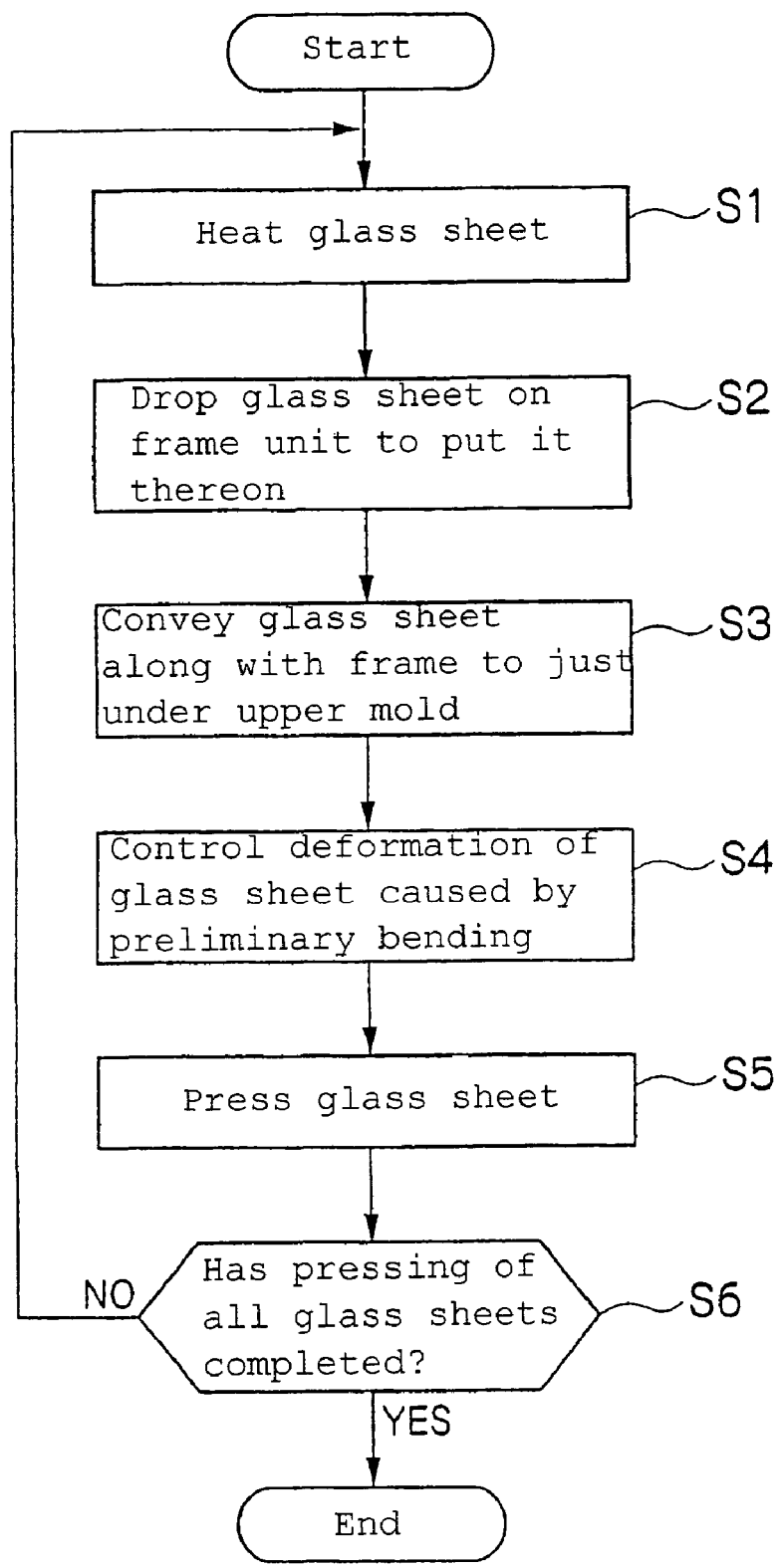
FIG. 6 is a flow chart showing a procedure to bend a glass sheet.

First, the flat glass sheet G, which has been cut in dimensions and a certain shape, is conveyed in a first half portion (an upstream or left side in FIG. 2) of the heating furnace 12 by the roller conveyor 28 to be heated to the certain bending temperature (at Step S1 in FIG. 6). The heated glass sheet G is conveyed from the first half portion of the heating furnace 12 into the positioning zone 14 by the roller conveyor 28.

Next, the glass sheet G, which has been conveyed in the positioning zone 14, is supported in an air-floating fashion by the hearth bed 30, and the glass sheet G is positioned at a certain position while the positioners 32 and 32 are brought into contact with edges of the glass sheet G in the air-floating state.

Next, the glass sheet G is stuck and held by the flat mold 35 and is moved toward the bending furnace 16 to convey the positioned glass sheet G into the bending furnace 16. In the bending furnace 16, the glass sheet G is released from the sticking and holding by the flat mold 35, and the glass sheet G falls and is supported by the frame 34 and the lower mold 56 (at Step S2 in FIG. 6). In this state, the flat mold 35 returns to the "original position" in the positioning zone 14 from the bending furnace 16.

In the bending furnace 16, the glass sheet G is put on the frame 34 of the lower mold 56. The frame 34 is normally located at a high position than the lower mold 56. At first, the frame 34 supports a peripheral portion of the glass sheet G, and then the lower mold 56 supports the glass sheet G, which is being deformed by gravity (preliminarily bent). Thus, the glass sheet G is prevented from being deformed more than necessary.

The lower mold 56 with the glass sheet G put thereon, and the like are conveyed to just under the upper mold 58 while the preliminary bending of the glass sheet G is continued (Step S3 in FIG. 6). When the lower mold 56 has arrived just under the upper mold 58, the male head for piping 88 is engaged with the female head for piping 89 to communicate the air path 86 to the air supply/exhaustion unit 160.

The operation wherein the glass sheet G on the lower mold 56 is preliminary bent by gravity is accelerated by actuating the air supply/exhaustion unit 160 for the lower mold 56 to suck air from the holes 56A in the lower mold 56 so as to bend the glass sheet G along the shape of the lower mold 56 (Step S4 in FIG. 6). The holes 56A and the air supply/exhaustion unit 160 correspond to the means for controlling an amount of preliminary bending.

At this time, the air suction by the lower mold 56 may be assisted by lowering the upper mold 58 to bring the upper mold near to the glass sheet G and injecting air from the holes 58A in the upper mold so as to cause the glass sheet G to follow the shape of the lower mold 56. When the air supply/exhaustion unit 160 is configured to move along with the lower mold 56 and the like, it is possible to accelerate the preliminary bending for a long time period since the air suction by the lower mold 56 can be performed in the course of conveying the glass sheet G from the hearth bed 30 to just under the upper mold 58.

When the acceleration for the preliminary bending by the lower mold 56 is completed, the upper mold 58 is lowered to be brought near to the glass sheet G. The bending of the glass sheet G by the upper mold 58 is performed by actuating the air supply/exhaustion unit 164 for the upper mold 58 to suck air from the holes 58A in the upper mold 58 so as to cause the glass sheet G to follow the shape of the upper mold 58 and pressing the glass sheet G by the upper mold 58 and the frame 34 (Step S5 in FIG. 6).

At this time, the air suction by the upper mold 58 may be assisted by switching the operation mode of the air supply/exhaustion unit 160 for the lower mold 56 to inject air from the holes 56A in the lower mold 56 so as to cause the glass sheet G to follow the shape of the upper mold.

The upper mold 58 bends the glass sheet G, is gradually rising and stops at a certain position. When the upper mold 58 starts rising, the air injection from the holes in the lower mold 56 is stopped. In synchronization with the air injection stop, a shuttle door 12A is opened, and the quench shuttle 68 is moved toward the left direction in FIG. 2 to insert the quench ring 72 between the lower mold 56 and the upper mold 58.

Next, the sticking and holding by the upper mold 58 is released to transfer the glass sheet G onto the quench ring 72. The quench shuttle 68 is moved toward the right direction in FIG. 2 to locate the quench ring 72 at "the air-cooling and tempering position" in the air-cooling and tempering zone 18. After that, the shuttle door 12A is closed, the glass sheet G is air-cooled and tempered by air injected from the upper blowing head 76 and the lower blowing head 78 in the air-cooling and tempering zone 18, and the glass sheet G is supported in an air-floating fashion by the air injected by the lower blowing head 78. At this time, a subsequent glass sheet G is conveyed into the bending furnace 16 by the flat mold 35.

Next, during air-cooling and tempering of the first glass sheet G, the quench shuttle 68 is moved toward the left direction in FIG. 2 to insert the quench ring 72 into between the lower mold 56 and the upper mold 58 again, and the subsequent pressed glass sheet G is transferred onto the quench ring 72. At this time, the catch member 74 is located at "the air-cooling and tempering position", and the first air-cooled and tempered glass sheet G is transferred onto the catch member 74 by ceasing the air-floating by the air-cooling and tempering zone 18.

After that, the quench shuttle 68 is moved toward the right direction in FIG. 2 to air-cool and temper the subsequent pressed glass sheet G in the air-cooling and tempering zone 18, and the first glass sheet CA which has been air-cooled and tempered by the air-cooling and tempering zone 18, is transferred onto the discharge roller conveyer 20. The transferred glass sheet G is conveyed to the inspection zone at the later stage by the discharge lower conveyer 20. The procedure stated above is repeated until a planed production number is achieved (Step S6 in FIG. 6).

As explained, the bending apparatus 10 according to this embodiment can accelerate or suppress the preliminary bending by the lower mold 56 to produce, with a high productivity, glass sheets having a complicated and deeply bent shape, which have been difficult to be produced. The bending apparatus can shorten the time period required for the preliminary bending in comparison with the case of using only gravity. The present invention is not limited to the embodiment but may be carried out in various kinds of embodiments. For example, although the glass sheets G are bent inside the heating furnace in the embodiment stated earlier, the glass sheets may be bent outside the heating furnace.

Now, other embodiments of the present invention will be described.

FIGS. 7 to 11 show various embodiments of the means for controlling an amount of the preliminary bending recited in Claims. It is possible to improve the bending accuracy of a glass sheet by using one of the embodiments or a combination of some of the embodiments. When a plurality of embodiments of means for controlling an amount of preliminary bending are incorporated in the bending apparatus, it is possible to appropriately select and use a desired means according to the type of a glass sheet or the like. Since glass sheets have different shapes, different sizes, different thicknesses and other different physical properties according to the type thereof, it is necessary to select a proper means for controlling an amount of preliminary bending. Information on the type of a glass sheet and a combination of some of the means for controlling an amount of preliminary bending to be applied to the type is saved in the database, which is provided in the controller CTR.

FIG. 7(a) shows an embodiment wherein a heater for accelerating the preliminary bending of a glass sheet (corresponding to the means for controlling an amount of preliminary bending recited in Claims) 170 is provided in the conveying path between the flat mold 35 and the upper mold 58. The heater 170 partially heats and softens the glass sheet G put on the bending surface 57 of the lower mold 56 (FIG. 2) to accelerate the preliminary bending of the glass sheet G by gravity. In this case, in order to intensively heat a deeply bent portion of the glass sheet G, electric heaters (or gas burners) 172 are provided to correspond to the deeply bent portion to preliminarily bend the glass sheet G in a shape approximate to the bending surface 57 of the lower mold 56 (or the bending surface 59 of the upper mold 58) in a short period of time.

The flat mold 35 can make only vertical movement. When the flat mold 35 sticks and holds the glass sheet G, the lower mold 56 moves to the position under the flat mold 35 (the receiving position for the glass sheet G) to receive the glass sheet G and moves to the position under the upper mold 58 (the pressing position for the glass sheet G). The lower mold 56 has a lower portion provided with a shuttle 174, which is slidably supported by rails (not shown) under a heath 176 and is driven by a drive for horizontal movement (not shown), such as a chain drive or a timing belt drive, to move the lower mold as stated above.

The lower mold 56, on which the glass sheet G has been put, stops just under the heater 170 on the way from the hearth bed 30 to the upper mold 58, heats the glass sheet G by the heater 170 for a certain period of time, and then moves toward a position just under the upper mold 58. The lower mold 56 may continuously moves at a low speed without stopping.

The heater 170 may be provided to be movable in the vertical direction, properly controlling the distance between the heater 170 and the glass sheet G according to the size or the thickness of the glass sheet G. The heater 170 may comprise a plurality of local heaters provided in a matrix pattern with respect to a glass surface so that the respective local heaters can independently and vertically move. The temperature of the glass sheet G can be changed as desired by independently controlling the heights and the temperatures of the local heaters 172.

As shown in FIG. 7(b), the flat mold 35 may be coupled with a suction duct 178 through a spherical joint 178a so that the flat mold 35 is swingable about a coupling pivot P. In this case, the flat mold 35 is coupled with rods 35b and 35b through links 35c and 35c, and the flat mold 35 can be swung by independently and vertically moving the respective rods 35b and 35b.

In some cases, the frame 34 has a partially raised portion so as to be suited for the shape of a curved glass to be produced. The flat mold 35 can be swung so as to drop the glass sheet G with a posture according to the shape of the frame 34, preventing a case wherein the glass sheet G locally collides with the frame 34 when the glass sheet G is dropped onto the frame 34. Thus, the impact given to the glass sheet G can be decreased to prevent the glass sheet G from having excessive deformation or a defect.

When the glass sheet G is positioned on the hearth bed 30, the flat mold 35 along with the suction duct 178 and the rods 35b lowers. By driving an unshown air supply/exhaustion unit coupled to the suction duct 178 to suck air from the holds 35a formed in the flat mold 35, the glass sheet G is sucked and held by the lower surface of the flat mold 35. Then, the suction of air is stopped to drop and put the glass sheet G on the frame 34 after the flat mold 35 is slanted according to the shape of the frame 34.

Figure 7:
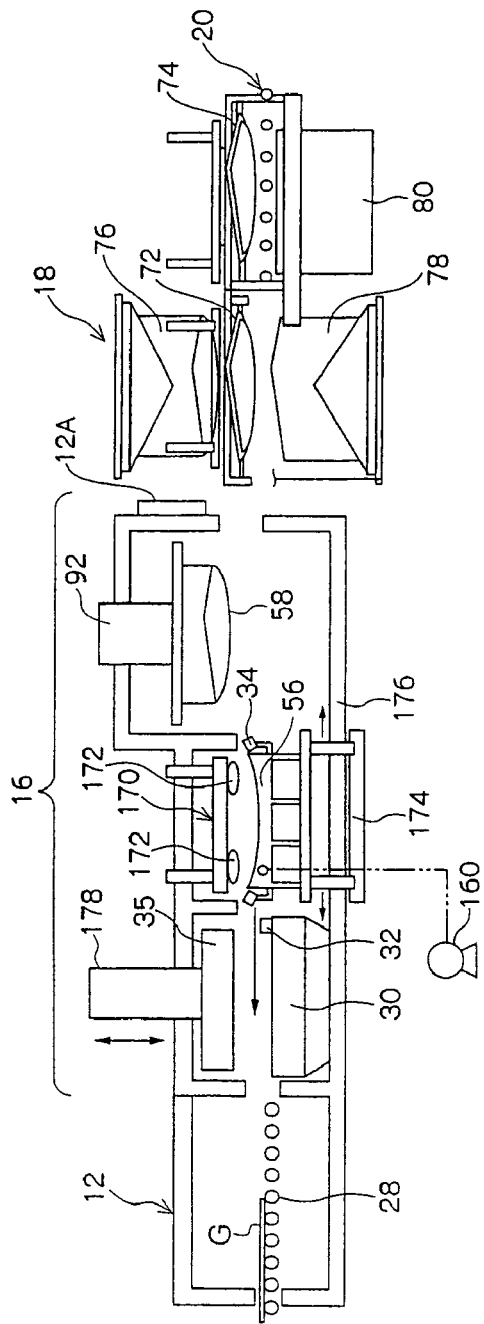
FIG. 7(a) is a schematic view showing the means for controlling an amount of preliminary bending according to another embodiment.
FIG. 7(b) is a side view showing the flat mold according to an embodiment, partly in section.
Figure 8:
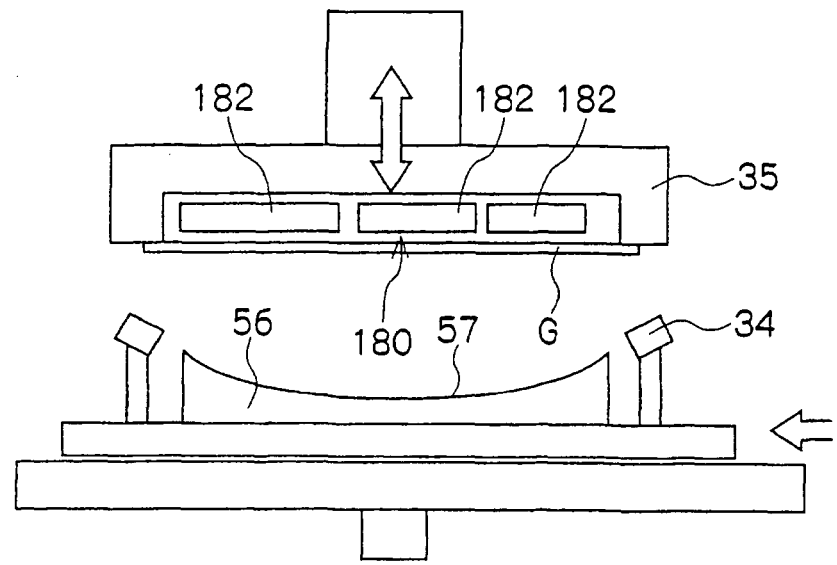
FIG. 8 is a schematic view showing the means for controlling an amount of preliminary bending according to another embodiment.

FIG. 8 shows a case wherein a heater for accelerating the preliminary bending (the means for controlling an amount of preliminary bending recited in Claims) 180 is provided on the flat mold 35. The glass sheet G, which has been sucked and held by the flat mold 35, can be preliminarily heated by the heater 180 before being transferred to the lower mold 56. By this arrangement, the glass sheet G is locally softened to accelerate the preliminary bending of the glass sheet G by the lower mold 56. The heater 180 comprises a plurality of electric heaters (or gas burners) 182 provided in a desired layout. This heater may be used in combination with the heater 170 shown in FIG. 7.

Figure 9:
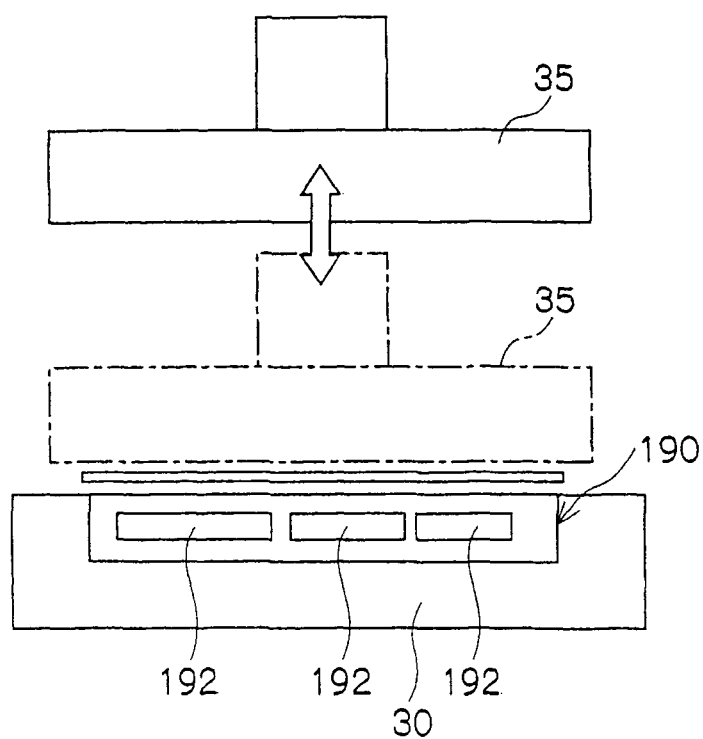
FIG. 9 is a schematic view showing the means for controlling an amount of preliminary bending according to another embodiment.

FIG. 9 shows a case wherein a heater for accelerating the preliminary bending (the means for controlling an amount of preliminary bending recited in Claims) 190 is provided on the hearth bed 30. The glass sheet G, which is supported above the hearth bed 30 in an air-floating fashion, is preliminarily heated by the heater 190 before being transferred to the lower mold 56. By this arrangement, the softening of the glass sheet G is promoted to accelerate the preliminary bending of the glass sheet G by the lower mold 56. The heater 190 comprises a plurality of electric heaters (or gas burners) 192 provided in a desired layout. This heater may be used in combination with the heater 170 shown in FIG. 7.

Figure 10A:
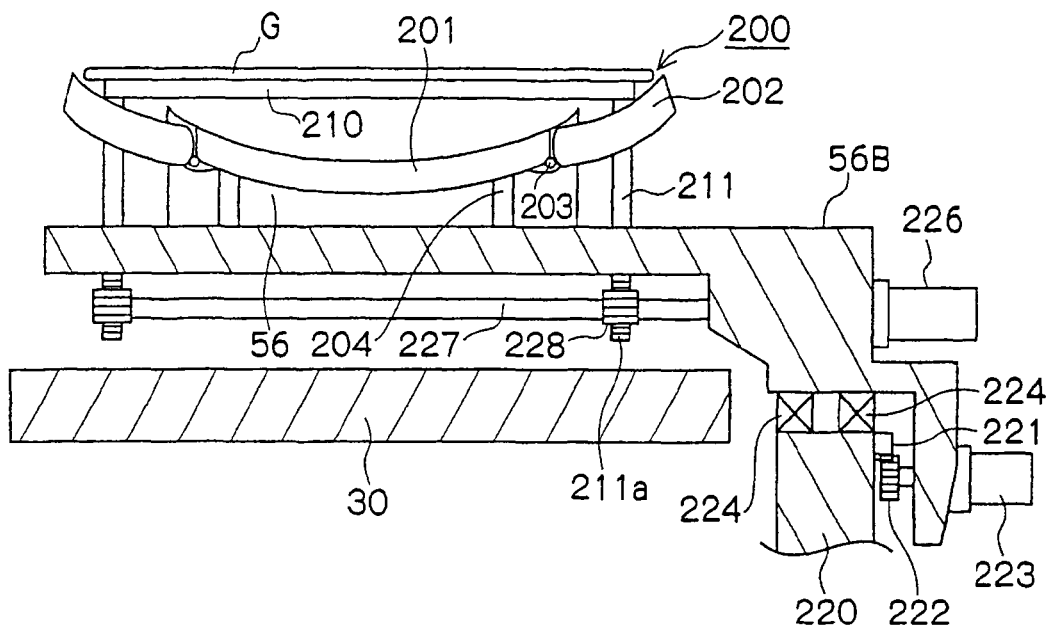
FIG. 10(a) is a side view showing the means for controlling an amount of preliminary bending according to another embodiment.
Figure 10B:
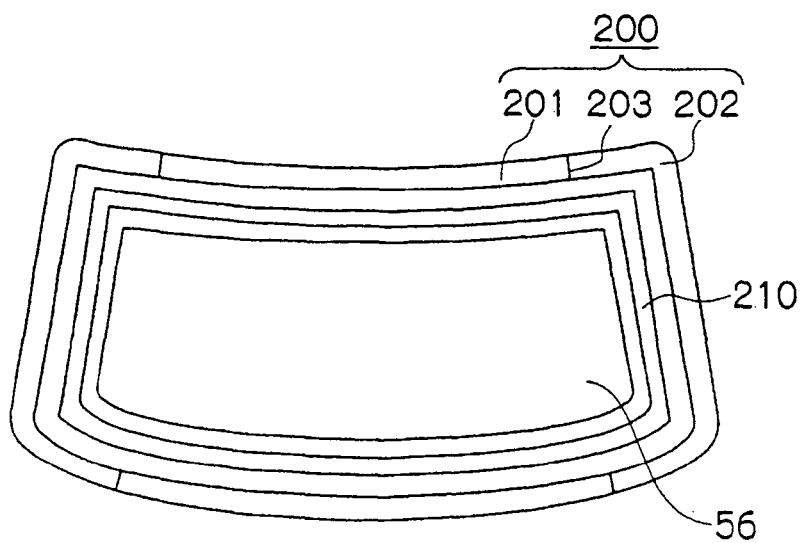
FIG. 10(b) is a plan view showing the means for controlling an amount of preliminary bending according to this embodiment.

FIGS. 10(a) and (b) shows a case wherein a frame unit comprising fixed frames and movable frames is used as the means for controlling an amount of preliminary bending. As shown in FIG. 10(b), the frame unit 200 comprises two fixed frame 201, four hinges 203 and two movable frames. As shown in FIG. 10(a), the fixed frames 201 are fixed to a carriage 56B by totally four supports 204 (only two of the supports locating on a front side in this figure being shown), and each of the fixed frames 201 has both ends coupled with a movable frame 202 through a hinge 203 so that the movable frame tiltable. The movable frames have an unshown driving unit mounted thereto. Each of the movable frames 202 can be tilted at a desired angle, being pivoted about the related hinges 203.

On the other hand, the frame unit 200 has an inner peripheral side provided with a frame unit 210 (corresponding to the inner side frame/flat member recited in Claims), which is substantially horizontal as viewed in a side elevation (which may be completely horizontal or a shallower curvature than the frame unit 200). The frame unit 210 is formed in a substantially rectangular shape as viewed in a top plan view as shown in FIG. 10(b) and has supports 211 fixed to four corners, only two of the supports being shown in FIG. 10(a).

Each of the supports 211 has one end extending through the carriage 56B and formed with a rack 211a. The rack 211a engages with a pinion 228 carried on a rotary shaft 227. The rotary shaft 227 is coupled with an unshown spindle of a servomotor 226 mounted to the carriage 56B to be rotated by the servomotor as desired. By driving the servomotor 226 to rotate the pinions 228, the racks 211a and the supports 211 can be vertically moved according to the rotational direction of the pinions to vertically move the frame unit 210 as desired.

The carriage 56B is provided on two linear motion guides (hereinbelow, referred to as the LM guides) 224 extending in a direction perpendicular to the drawing sheet (i.e., the conveying direction for a glass sheet), so that the carriage is slidable in this direction. The LM guides 224 are held on bases 220 provided on an unshown hearth. Each of the bases 220 has a sidewall formed with a rack 221. The rack 221 is engaged with a pinion 222, and the pinion 222 is coupled with an unshown spindle of a servomotor 223 provided on the carriage 56B. When the pinion 223 is rotated by driving the servomotor 223, the carriage 56 can move forward and backward on the LM guides 224 according to the rotational direction of the pinion to move the frame unit 200 from the position just under the flat mold 35 to the position just under the upper mold 58 in FIG. 7.

As explained, the glass sheet G, which has been dropped from the flat mold 35 shown in FIG. 7, can be first received by the frame unit 210 and be gradually transferred onto the frame unit 200, being prevented from locally colliding with a hinge 203 or a position of the lower mold 56 to be damaged. By rapidly changing the tilt of the movable frames 202 while moving the frame unit 200 from the position just under the flat mold 35 to the position just under the upper mold 58, it is possible to positively bend ends of the glass sheet G and to complete the preliminary bending for a short period of time.

The frame unit 210 has an inner periphery side provided with the lower mold 56, which is similar to the one stated with respect to FIG. 1. The lower mold 56 connected to one end of a flexible hose (not shown), and the flexible hose has the other end connected to a vacuum unit (not shown). By this arrangement, it is possible to accelerate the preliminary bending by starting the vacuum operation during conveying the glass sheet G. The frame units 200 and 210 and the lower mold 56 correspond to the means for controlling an amount of preliminary bending recited in Claims.

The procedure to bend a glass sheet according to this embodiment will be described. The frame unit 210 is located at a higher position than the frame unit 200, and the lower mold 56 is located at a slightly lower position than the fixed frames 201 just before receiving the glass sheet G from the flat mold 35 shown in FIG. 2. Thus, the glass sheet G, which has been dropped from the flat mold 35, is transferred onto the frame unit 210. After that, the carriage 56B starts horizontal movement toward the position just under the upper mold 58, and the frame unit 210 starts being lowered by an unshown drive. As a result, edges of the glass sheet G are gradually transferred onto the movable frame 202.

The movable frames 202 start to perform an upward tilt under the action of an unshown drive, being pivoted about the hinges 203. These sequential operations are performed until the carriage 56B has arrived at the position just under the upper mold 58. The glass sheet G is completely transferred from the frame unit 210 to the frame unit 200 in the end. After that, the upper mold 58 lowers to press the glass sheet G between the frame unit 200 and the upper mold 58. At this time, the movable frames 202 are further upward tilted to press edges of the glass sheet G against the bending surface of the upper mold 58. When the pressing of the glass sheet G stated above is completed, air suction is performed at the bending surface of the upper mold 58 to stick the glass sheet G so as to bring it into contact with the bending surface of the upper mold 58, and the glass sheet G is transferred onto the quench ring stated earlier. The subsequent procedure is similar to the one stated earlier.

Figure 11A:
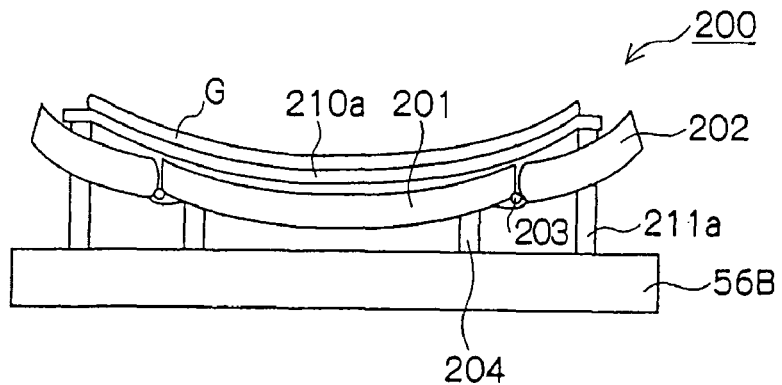
FIG. 11(a) is a side view showing the means for controlling an amount of preliminary bending according to another embodiment.
Figure 11B:
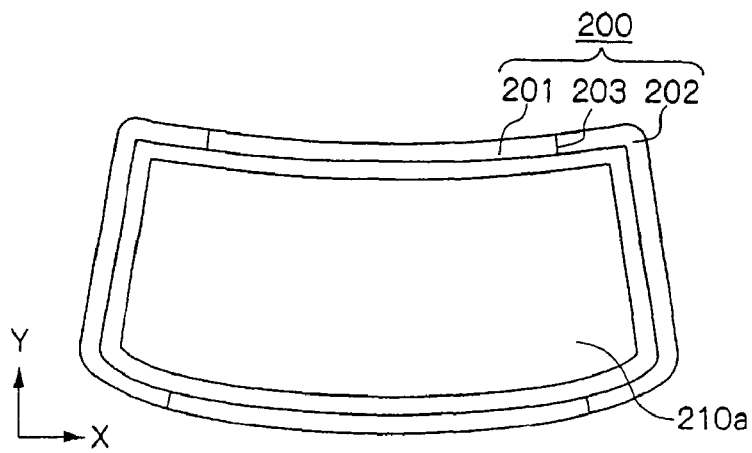
FIG. 11(b) is a plan view showing the means for controlling an amount of preliminary bending according to this embodiment.

FIGS. 11(a), (b) and (c) show modified embodiments of the means for controlling an amount of preliminary bending shown in FIGS. 10(a) and (b). In the first modified embodiment, the lower mold 220 shown in FIG. 10(a) and (b) is eliminated, and a vertically movable curved plate 210a is provided in place of the lower mold. The curved plate 210a (corresponding to the inner side frame/flat member recited in Claims) is supported by the supports 211a as in the frame unit 210, and the supports 211a are vertically moved by an unshown drive. The curved plate 210a has a surface to put the glass sheet G thereon formed in a shape having a single curve or a plurality of curves. By this arrangement, the glass sheet G can be preliminarily bent by gravity even before having been transferred onto the frame unit 200.

Figure 11C:
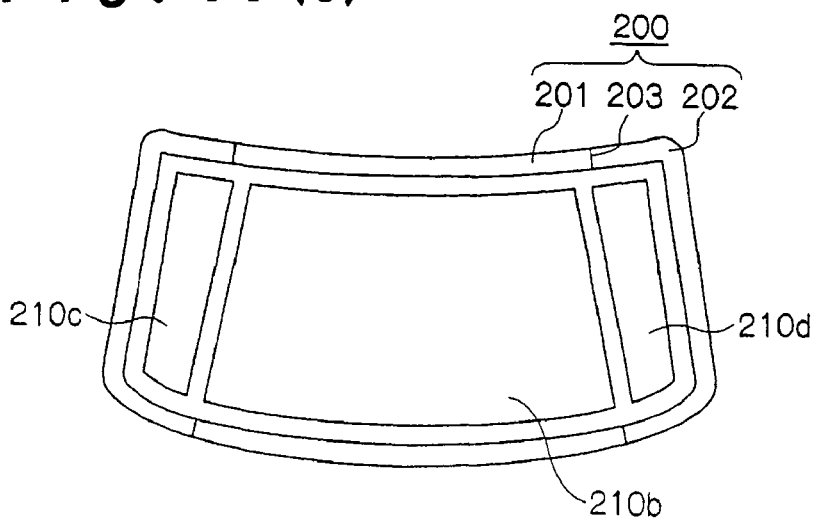
FIG. 11(c) is a plan view showing the means for controlling an amount of preliminary bending according to another embodiment.

As shown in FIG. 11(c), a lower mold 210b, which is not vertically movable, may be provided at a central position and have vertically movable plates 210c and 210d provided on both sides thereof. The movable plates 210c and 210d have a surface to put the glass sheet G thereon formed in a shape having a single curve or a plurality of curves.

Figure 12:
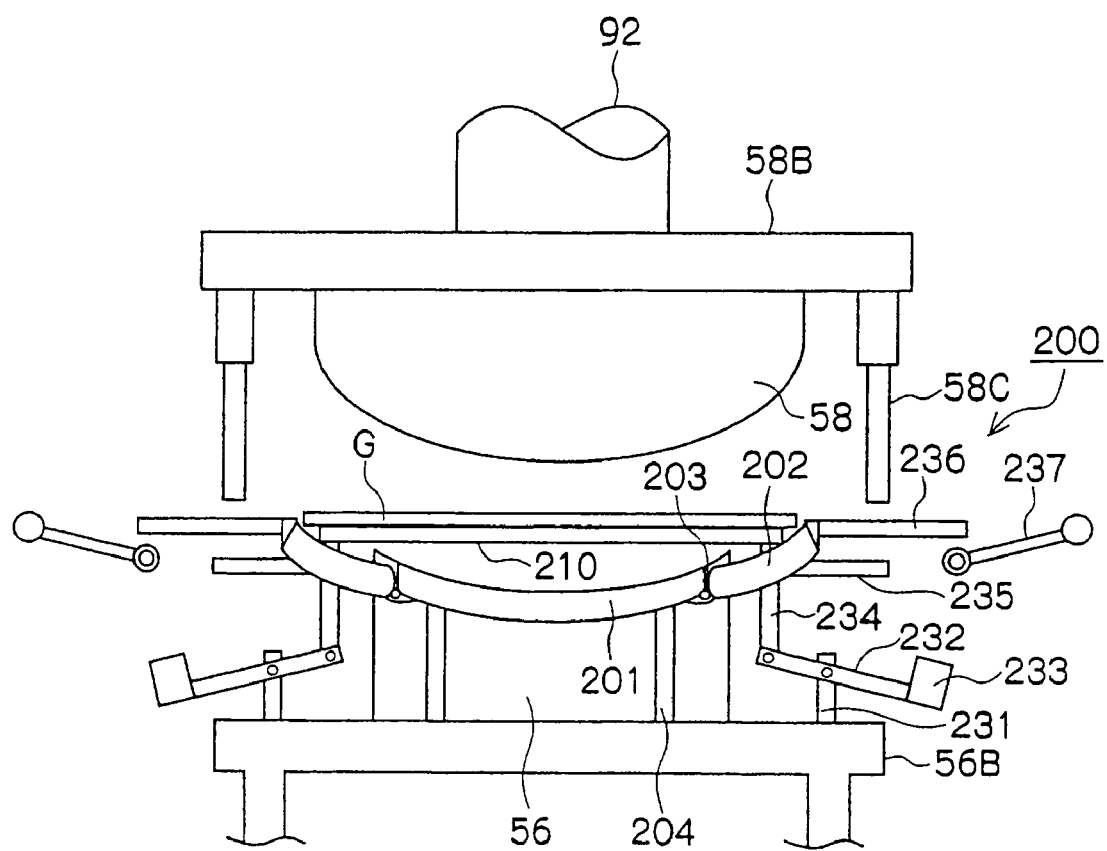
FIG. 12 is a side view showing the means for controlling an amount of preliminary bending according to another embodiment.

FIG. 12 shows a modified embodiment of the frame unit 200. As shown in this figure, a lower mold 56, a frame unit 210 provided around the lower mold 56 so as to be vertically movable, and a frame unit 200 provided around the frame unit 210 are provided on the carriage 56B. The lower mold 56 supports the heated glass sheet G at a region near to a central portion of the glass sheet so as to prevent the softened glass sheet G from excessively flexing.

Although the frame unit 210 is normally maintained at the highest position under the action of counterweights 233, this frame unit can be lowered when pressure-receiving portions 235 are pushed by pushing rods 58c. The carriage 56B has supporting frames 231 extending upward therefrom, and each of the supporting frames 231 has a frame 232 provided thereon so as to be pivotable. Each of the frames 232 has a counterweight 233 provided at one end and a frame 234 pivoted on the other end. Each of the frames 234 has the frame unit 210 and a pressure-receiving portion fixed to one end.

The frame unit 210 is a metal instrument, which has a smaller size than the outer size of the unbent glass sheet G and supports the glass sheet G at a slightly inner position of the glass sheet away from the outer periphery of the glass sheet. The frame unit 210 has a horizontal shape (or a curve shape) as viewed in a side elevation and is covered with heat-resistant woven cloth, such as stainless cloth, in order to prevent the glass sheet G put thereon from being damaged.

The frame unit 200 comprises fixed frames 201 supported by supports 204 vertically provided on the carriage 56B, movable frames 202 coupled with the fixed frames 201 through hinges 203, and frames 236 fixed to the movable frames 202. Each of the frames 236 has one end, which can be brought into contact with an arm 237 coupled with the spindle of an unshown servomotor so that a movable frame 202 is swung, being pivoted about the related hinges.

On the other hand, an upper mold 58 is on standby above the frame unit 200. The upper mold 58 is provided on a carriage 58B so as to have a bending surface facing downward, the carriage 58B has the pushing rods 58C provided thereon so as to extend downward, and the upper mold 58 communicates with a duct 92. The upper mold 58 has a metal mold with a hollow space therein and has a surface for contact with the glass sheet G formed in a certain curved shape. The bending surface has numerous holes formed therein. By sucking air through the duct 82, air can be sucked into the mold through the holes to stick and hold a pressed glass sheet G. Conversely, air can be blown out through the duct 92.

As stated earlier, when the glass sheet G is pressed, the pushing rods 58c push the pressure-receiving portions 235 to lower the frame unit 210, transferring the glass sheet G on the frame unit 210 onto the frame unit 200. By adopting such an arrangement, the servomotor for vertically moving the frame unit 210 can be eliminated, reducing the costs and simplifying the control for bending operations.

INDUSTRIAL APPLICABILITY

As explained, in accordance with the present invention, a glass sheet can be preliminarily bent in a shape approximate to the bending surface of a mold or the like by controlling deformation during preliminary bending of the glass sheet. As a result, it is possible to prevent the glass sheet from being subjected to distortion during pressing, which is performed after preliminary bending. Additionally, it is possible to produce, with high productivity, a glass sheet having such a complicated shape or a deeply bent shape that has been difficult to be realized by the conventional technique. Additionally, it is possible to further improve bending accuracy, quality and the like by performing bending of a glass sheet in the heating furnace.

Additionally, it is possible to prevent a glass sheet from being excessively bent at the preliminary bending stage since a glass sheet in a sagging fashion can be supported by the lower mold, which is provided within the inner peripheral side of the frame unit. Additionally, it is possible to improve bending accuracy by sucking air through the plural holes formed in the bending surface of the upper mold. The present invention is applicable to bend a glass sheet, which is used for an automobile, a railway vehicle, a ship, an airplane, a building or the like. The present invention is particularly suited to bend a glass for the rear windshield of an automobile.

The entire disclosure of Japanese Patent Application No. 2002-068608 filed on Mar. 13, 2002 including specification, claims, drawings and summary is incorporated herein by reference in its entirety.

What is claimed is:

1. A method for bending a glass sheet, comprising:
preliminarily heating a glass sheet such that the glass sheet is softened for bending;
placing the glass sheet on a bending surface of a frame unit such that the glass sheet goes through a preliminarily bending by gravity before pressed by an upper mold and the frame unit;
pressing the glass sheet by the upper mold and the frame unit, wherein the upper mold has a bending surface facing down in a substantially vertical direction, the frame unit has the bending surface facing up in the substantially vertical direction and is configured to engage with the bending surface of the upper mold; and
controlling an amount of the preliminary bending by at least first and second preliminary bending controlling devices each configured to control deformation of the glass sheet caused by the preliminary bending, the first preliminary bending controlling device including a fixed frame and a movable frame configured to pivot on the fixed frame, said controlling comprising tilting the movable frame with respect to the fixed frame such that an end portion of the glass sheet is raised during said preliminary bending and the preliminary bending is accelerated before pressed by an upper mold and the frame unit, the second preliminary bending controlling device including a heater provided at a position to partially heat the glass sheet at a portion of the glass sheet desired to have a bend therein, wherein the preliminary bending device includes an outer frame unit comprising the fixed frame and the movable frame and an inner frame unit provided on an inner peripheral side of the outer frame unit and having a flatter shape than the outer frame unit, the inner frame unit is configured to transfer the glass sheet onto the outer frame unit, the fixed frame and the movable frame are joined by a pivoting device, and the glass sheet is transferred to the inner frame unit after the heating and onto the outer frame unit from the inner frame unit for the preliminary bending.

2. The method according to claim 1, further comprising:
dropping the glass sheet onto the frame unit to place the glass sheet on the bending surface of the frame unit; and
conveying the glass sheet to a position just under the upper mold in such a state that the glass sheet is on the frame unit; and
preliminarily bending the glass sheet in a shape approximate to the bending surface of the upper mold by using the second preliminary bending controlling device during a time at least just before putting the glass sheet on the frame unit, and using the first preliminary bending controlling device during a time at least just before pressing the glass sheet.

3. The method according to claim 1, further comprising:
supporting the glass sheet in an air-floating fashion by an air-floating device;
positioning the glass sheet for the placing of the glass sheet by the air-floating device;
sticking and holding the glass sheet by a sticking device; and
conveying the glass sheet to a position above the frame unit by the sticking device, the sticking device being brought near to the glass sheet from above, wherein said second preliminary bending controlling device is provided in at least one of the air-floating device and the sticking device.

4. The method according to claim 1, further comprising:

providing a third preliminary bending controlling device configured to control an amount of the preliminary bending by at least one of an air injection force and an air suction force on the glass sheet to be bent; and selecting at least one of the first, second and third preliminary bending controlling devices in accordance with a type of the glass sheet to be bent.

5. The method according to claim 4, wherein the third preliminary bending controlling device is provided in at least one of the upper mold and frame unit.

6. A method for bending a glass sheet, comprising:

preliminarily heating a glass sheet such that the glass sheet is softened for bending;

placing the glass sheet on a bending surface of a frame unit such that the glass sheet goes through a preliminarily bending by gravity before pressed by an upper mold and the frame unit;

pressing the glass sheet by the upper mold and the frame unit, wherein the upper mold has a bending surface facing down in a substantially vertical direction, the frame unit has the bending surface facing up in the substantially vertical direction and is configured to engage with the bending surface of the upper mold; and controlling an amount of the preliminary bending is controlled by a preliminary bending controlling device configured to control deformation of the glass sheet caused by the preliminary bending, the preliminary bending controlling device including a fixed frame and a movable frame configured to pivot on the fixed frame, said controlling comprising tilting the movable frame with respect to the fixed frame such that an end portion of the glass sheet is raised during said preliminary bending and the preliminary bending is accelerated before pressed by an upper mold and the frame unit, wherein the preliminary bending device includes an outer frame unit comprising the fixed frame and the movable frame and an inner frame unit provided on an inner peripheral side of the outer frame unit and having a flatter shape than the outer frame unit, the inner frame unit is configured to transfer the glass sheet onto the outer frame unit, and the fixed frame and the movable frame are joined by a pivoting device.

7. A method for bending a glass sheet, comprising:

preliminarily heating a glass sheet such that the glass sheet is softened for bending;

placing the glass sheet on a bending surface of a frame unit such that the glass sheet goes through a preliminarily bending by gravity before pressed by an upper mold and the frame unit;

pressing the glass sheet by the upper mold and the frame unit, wherein the upper mold has a bending surface facing down in a substantially vertical direction, the frame unit has the bending surface facing up in the substantially vertical direction and is configured to engage with the bending surface of the upper mold; and controlling an amount of the preliminary bending is controlled by a preliminary bending controlling device configured to control deformation of the glass sheet caused by the preliminary bending, the preliminary bending controlling device including a fixed frame and a movable frame configured to pivot on the fixed frame, said controlling comprising tilting the movable frame with respect to the fixed frame such that an end portion of the glass sheet is raised during said preliminary bending and the preliminary bending is accelerated before pressed by an upper mold and the frame unit, wherein said controlling comprises controlling an amount of preliminary bending by a preliminary bending controlling device having an inner side frame flat member on which the glass sheet is transferred after dropping from a flat mold.

* * * * *